(No Model.) 2 Sheets—Sheet 1.
J. M. CLELAND.
EXPANSIBLE SPROCKET WHEEL FOR BICYCLES, &c.
No. 598,654. Patented Feb. 8, 1898.
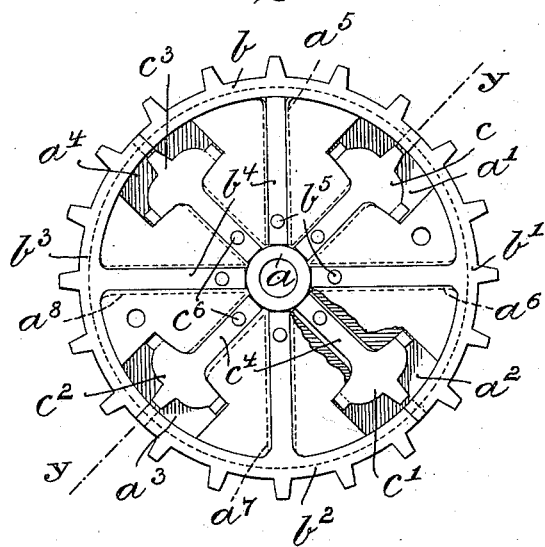
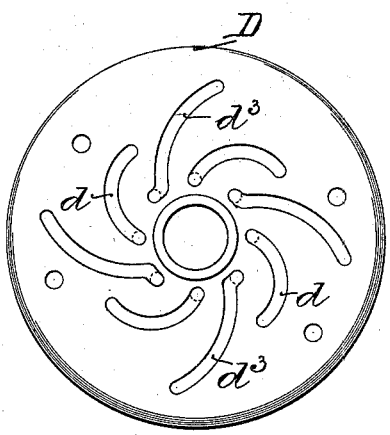
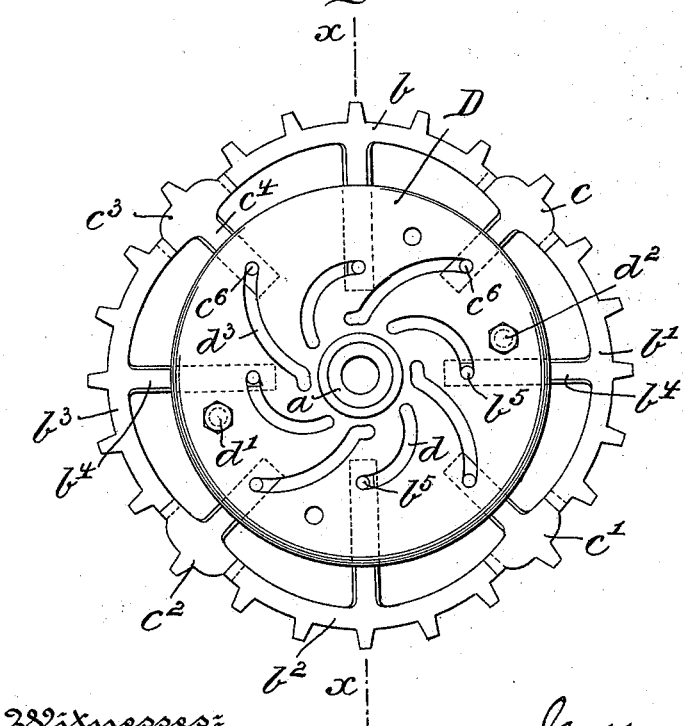
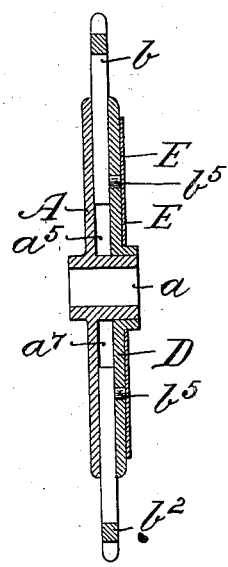
Witnesses:
Thomas M. Smith.
Richard E. Maxwell.
Inventor:
James Moncrief Cleland,
By J. Walter Douglass
Attorney.

(No Model.) 2 Sheets—Sheet 2.
J. M. CLELAND.
EXPANSIBLE SPROCKET WHEEL FOR BICYCLES, &c.
No. 598,654. Patented Feb. 8, 1898.
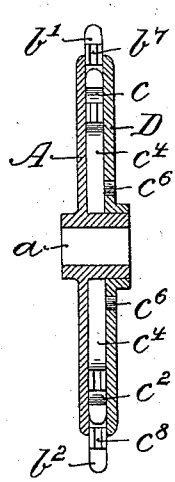
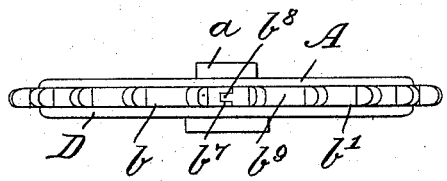
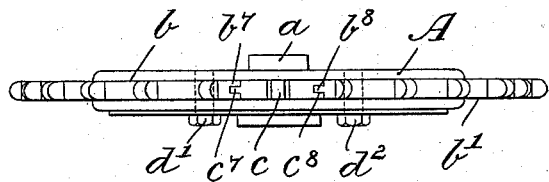
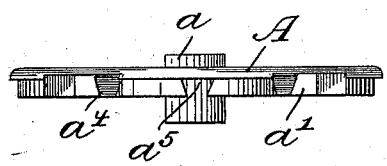
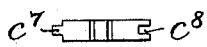
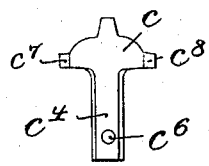
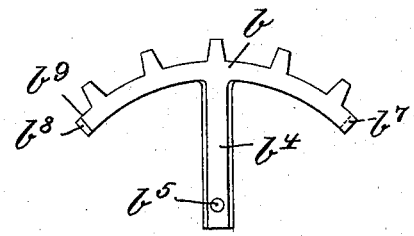
Witnesses:
Thomas M. Smith.
Richard C. Maxwell.
Inventor:
James Moncrief Cleland,
By J. Walter Douglass
Attorney.
THE NORRIS PETERS CO., PHOTO-LITHO., WASHINGTON, D. C.

UNITED STATES PATENT OFFICE.

JAMES MONCRIEF CLELAND, OF PHILADELPHIA, PENNSYLVANIA.

EXPANSIBLE SPROCKET-WHEEL FOR BICYCLES, &c.

SPECIFICATION forming part of Letters Patent No. 598,654, dated February 8, 1898.

Application filed June 2, 1897. Serial No. 639,139. (No model.)

*To all whom it may concern:*

Be it known that I, JAMES MONCRIEF CLELAND, a citizen of the United States, residing at the city of Philadelphia, in the county of Philadelphia and State of Pennsylvania, have invented certain new and useful Improvements in Expansible Sprocket-Wheels, of which the following is a specification.

My invention has relation to an expansible sprocket-wheel for bicycles and for other uses; and in such connection it relates particularly to the construction and arrangement of a sprocket-wheel, whereby when the diameter of the sprocket is expanded the number of teeth on its periphery will be increased.

The principal object of my invention is to provide a simple, durable, and easily-adjustable sprocket adapted to be expanded or contracted and when expanded adapted to have the number of teeth on its periphery increased; and to this end my invention consists in forming a sprocket of a number of toothed segments adapted to be expanded and contracted and when expanded the space between adjacent segments adapted to be filled by auxiliary teeth.

The nature and scope of my invention will be more fully understood from the following description, taken in connection with the accompanying drawings, forming part hereof, in which—

Figure 1 is a side elevational view, partly sectioned, of a sprocket-wheel embodying main features of my invention, the wheel being in contracted position. Fig. 2 is a side elevational view of the disk or cap-plate adapted to advance and retract the segments and auxiliary teeth of the sprocket. Fig. 3 is a side elevational view of the sprocket and its cap-plate, showing the sprocket in expanded position. Fig. 4 is a vertical central section on the line $x\ x$ of Fig. 3. Fig. 5 is a sectional view taken on the line $y\ y$ of Fig. 1. Fig. 6 is a top or plan view of the sprocket in contracted position. Fig. 7 is a top or plan view of the sprocket in expanded position. Fig. 8 is a top or plan view of the body of the sprocket-wheel with the toothed segments and auxiliary teeth removed. Fig. 9 is a side elevational view of one of the toothed segments removed from the wheel. Fig. 10 is a side elevational view of one of the auxiliary teeth removed from the wheel, and Fig. 11 is a top or plan view of Fig. 10.

Referring to the drawings, A represents the body or frame of the sprocket, having integral therewith a hub $a$. This body A is provided with a series of radially-arranged recesses or chambers $a'$, $a^2$, $a^3$, and $a^4$, together with a series of radially-arranged slots $a^5$, $a^6$, $a^7$, and $a^8$, substantially as shown in Figs. 1, 4, and 8. In the slots $a^5$, $a^6$, $a^7$, and $a^8$ the spokes or arms $b^4$ of the toothed segments $b$, $b'$, $b^2$, and $b^3$ are adapted to slide, and in the recesses or chambers $a'$, $a^2$, $a^3$, and $a^4$ a series of auxiliary teeth $c$, $c'$, $c^2$, and $c^3$ are also adapted to slide. Each tooth $c$, $c'$, $c^2$, and $c^3$ is provided with an arm $c^4$, to which is secured a pin or projection $c^6$, and each spoke $b^4$ of the segments $b$, $b'$, $b^2$, and $b^3$ is also provided with a pin or projection $b^5$. On the hub $a$ loosely rotates a disk or cap-plate D, having two series of cam-slots $d$ and $d^3$, the cam-slots $d$ arranged to receive the pins $b^5$ of the segments and the slots $d^3$ the pins $c^6$ of the auxiliary teeth. The slots $d$ differ in arrangement from the slots $d^3$ in that when the cap-plate is turned in one direction the pins $b^5$ are advanced by the slots $d$ before the pins $c^6$ are advanced by the slots $d^3$, and when the cap-plate is turned in the opposite direction the pins $c^6$ are retracted before the pins $b^5$ are moved. As shown in Figs. 9, 10, and 11, the auxiliary teeth $c$, $c'$, $c^2$, and $c^3$ are grooved and tongued, as at $c^8$ and $c^7$, to fit complemental grooves and tongues $b^7$ and $b^8$ in the segments $b$, $b'$, $b^2$, and $b^3$. The slots $d$ and $d^3$ of the cap-plate D may be protected by a dust-plate E, as shown in Fig. 4, to prevent mud, &c., clogging up the slots and preventing the operation of the toothed segments and auxiliary teeth.

The operation of the device is as follows: Assuming the normal position of the sprocket to be that illustrated in Fig. 1 or contracted, the cap-plate D is turned from left to right, thereby first through the slots $d$ advancing the pins $b^5$ and the segments $b$, $b'$, $b^2$, and $b^3$ and thereafter advancing the auxiliary teeth $c$, $c'$, $c^2$, and $c^3$ through the slots $d^3$ and pins $d$ until said teeth slide into the openings in the rim of the sprocket formed between adjacent segments in expanded position. The teeth by reason of the tongues $c^7$ and $b^7$ and grooves $c^8$ and $b^8$ interlock with the segments, the expanded wheel having a continuous rim or periphery with auxiliary teeth, as shown in Fig. 3. A reverse movement of the cap-plate D will first withdraw the teeth $c$, $c'$, $c^2$, and $c^3$ from the rim, after which the segments will be contracted, the teeth remaining below or within the rim, as shown in Fig. 1.

Having thus described the nature and object of my invention, what I claim as new, and desire to secure by Letters Patent, is—

1. In an expansible sprocket-wheel, a series of toothed segments adapted to be expanded and retracted, a series of auxiliary teeth adapted when the segments are expanded to fill the space between adjacent segments and to thereby increase the number of teeth on the periphery of the sprocket, and means for expanding and contracting said segments and auxiliary teeth, substantially as and for the purposes described.

2. In an expansible sprocket-wheel, a series of toothed segments, a series of auxiliary teeth and a cap-plate provided with two series of slots, said cap-plate when turned in one direction adapted through one series of slots to first advance the segments and thereafter the teeth, and when turned in the opposite direction adapted through the other series of slots to first retract the teeth and then the segments, said teeth when advanced adapted to fill the space between adjacent segments and when retracted to lie below the rim of the retracted segments, substantially as and for the purposes described.

In testimony whereof I have hereunto set my signature in the presence of two subscribing witnesses.

JAS. MONCRIEF CLELAND.

Witnesses:
THOMAS M. SMITH,
RICHARD C. MAXWELL.